UNITED STATES PATENT OFFICE.

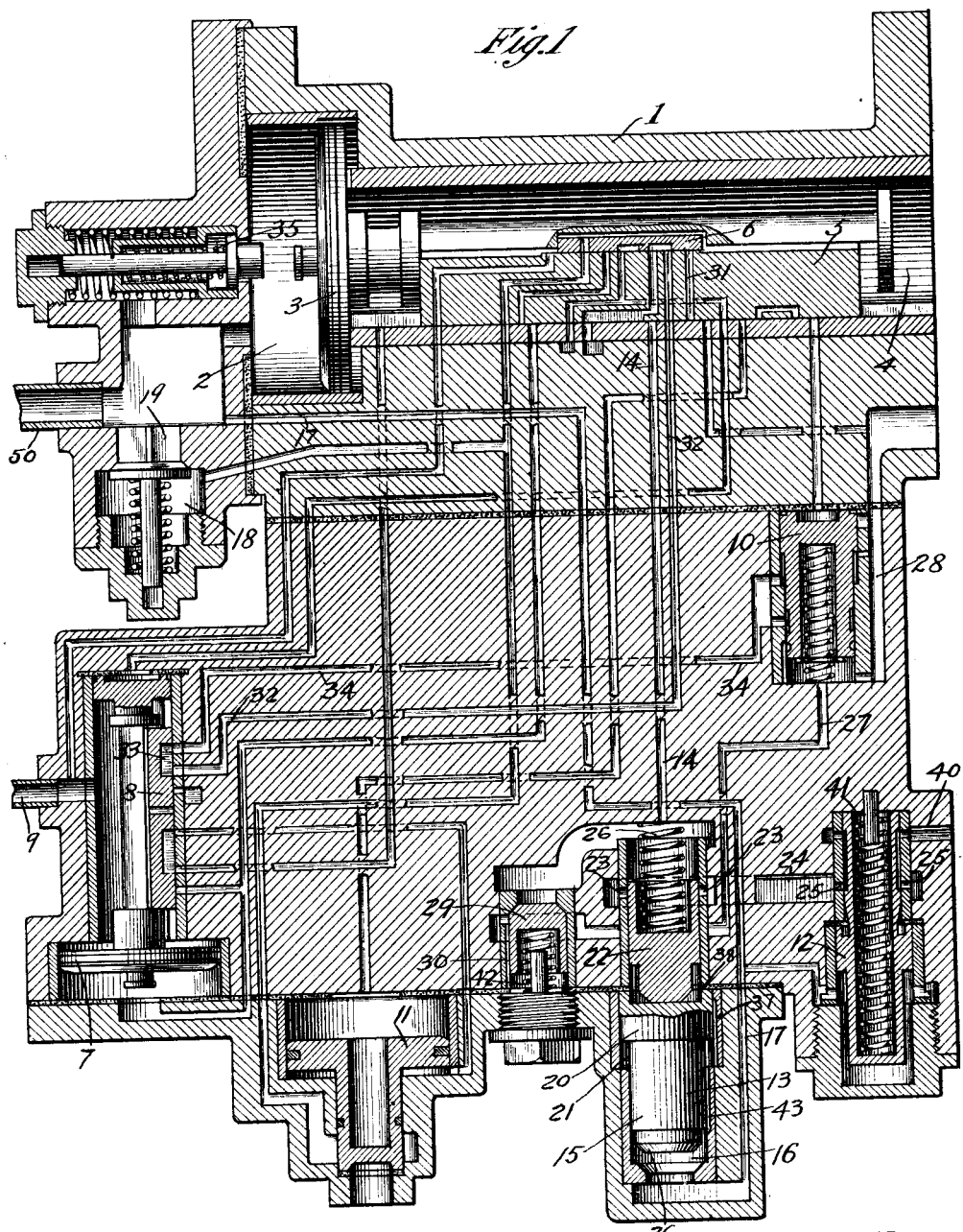

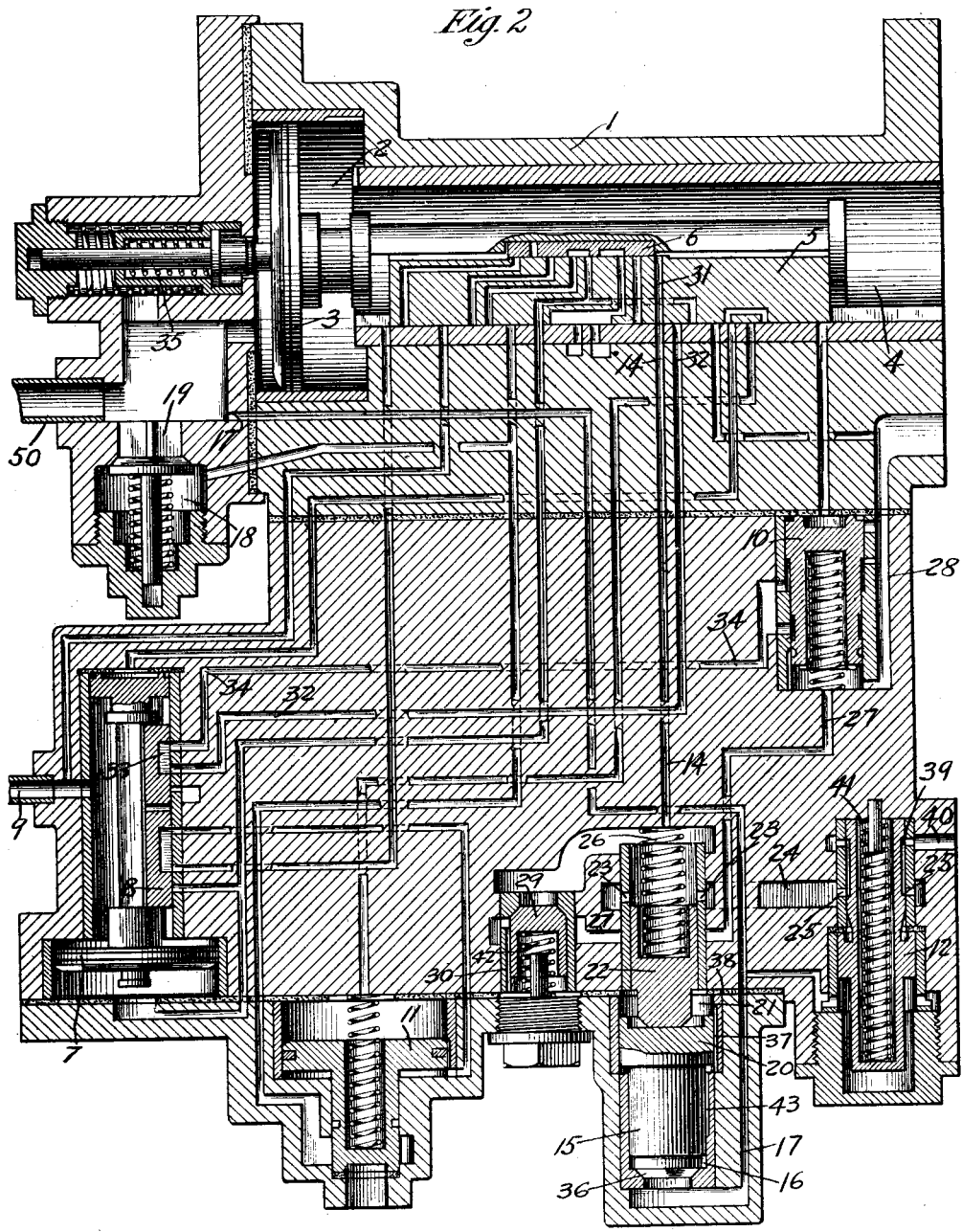

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,131,970.    Specification of Letters Patent.    Patented Mar. 16, 1915.

Application filed December 27, 1910. Serial No. 599,568.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and is more particularly in the nature of an improvement in connection with certain features covered in my prior pending applications; Serial No. 481,942, filed March 8, 1909, and Serial No. 509,163, filed July 23, 1909.

One object of the invention covered in the above mentioned applications is to provide means for preventing an emergency application of the brakes when only a gradual reduction in train pipe pressure is made, even after equalization of the auxiliary reservoir into the brake cylinder, while retaining the ability to obtain an emergency application at any time upon a sudden reduction in train pipe pressure.

Broadly stated, the above object is attained by providing means adapted upon movement of the triple valve parts beyond the usual service application position to a certain position intermediate service and emergency application positions, to vent air from the auxiliary reservoir side of the triple valve, so that the auxiliary reservoir pressure is reduced to a degree equal to or slightly less than the opposing train pipe pressure, thereby causing the triple valve piston to move back and cut off the further venting of air from the auxiliary reservoir.

The same operation of venting air from the auxiliary reservoir to equalize the pressure therein with the train pipe pressure is repeated upon further reductions in train pipe pressure, thus preventing the movement of the triple valve to emergency application position upon any gradual reduction in train pipe pressure.

As with the usual triple valve device, it sometimes happens that the triple valve parts stick and are sluggish in movement, so that when the parts finally move, they are liable to shoot over the usual service position either to emergency position with the usual type of triple valve or to the second service position with the present type. In case this occurs, it will be seen that no air will be supplied to the brake cylinder, while fluid from the auxiliary reservoir will be vented through the second service port and thus wasted.

The principal object of my present invention is to avoid such a possibility as that mentioned above, and for this purpose the invention consists in providing means adapted, upon any accidental or premature movement of the triple valve parts to the second service position, to prevent the venting of air from the auxiliary reservoir and also in such case to supply air to the brake cylinder.

In the accompanying drawings; Figure 1 is a diagrammatic sectional view of a triple valve device embodying my improvement, showing the parts in normal release position, and Fig. 2 a similar view, showing the parts in the second service position.

While my improvement may be employed in connection with various other types of triple valves and brake controlling valves, the same is shown in the present drawings as applied to a triple valve device of the type adapted to supply air from an additional source of pressure as well as the usual auxiliary reservoir to the brake cylinder in an emergency application of the brakes, and comprises a triple valve casing 1 having a piston chamber 2 containing triple valve piston 3, a valve chamber 4 open to the auxiliary reservoir and containing main slide valve 5 and auxiliary slide valve 6 mounted on the main slide valve and having a movement relative thereto. A by-pass valve device is provided comprising a piston 7 and slide valve 8 for controlling the supply of air from an additional source of fluid under pressure, connected to pipe 9, to the brake cylinder. A transfer valve device 10 also controls the supply of fluid in an emergency application of the brakes first from the auxiliary reservoir and then from the additional source of fluid under pressure to the brake cylinder. An emergency valve device 11 is also provided for controlling the venting of air from the train pipe to secure quick action in an emergency application of the brakes. As in my application Serial No. 509,163 hereinbefore referred to, a valve mechanism 12 is provided for controlling the venting of air from the auxiliary reservoir in the second service position of the triple valve parts.

According to my present invention, a piston valve device 13 is provided for controlling communication from the second service port 14 to the valve mechanism 12. The piston valve device comprises a head 15 contained in piston chamber 16 and having one side subject to train pipe pressure supplied thereto through a passage 17 leading to a chamber of the triple valve device which is connected to the train pipe 50.

The head 15 has an enlarged portion 20 contained in piston chamber 21 and secured to or integral therewith is a valve head 22 adapted to control communication from the second service port 14 through ports 23 to a passage 24 leading to ports 25 controlled by the valve mechanism 12.

The outer face of the valve head 22 is subject to the pressure supplied through port 14 and also to the pressure of a coil spring 26.

A passage 27 leading to one side of the transfer valve 10 which is normally open to brake cylinder passage 28 is provided and a check valve 29 controls communication from the service port 14 to said passage 27 and the passage 28. A port 30 connects the passage 27 to the chamber at the outer face of the check valve 29 so that said face is normally subject to the brake cylinder pressure.

Upon supplying fluid to the train pipe, the brake apparatus becomes charged to the normal standard pressure in the usual manner, and in addition, air from the train pipe flows through passage 17 to the outer face of piston head 15. Said piston head is preferably provided with a seat 36, so as to prevent any leakage from the train pipe when seated, and as said seat is of less area than the body of the head 15, it requires a certain predetermined pressure in the train pipe to lift the head against the resistance of the spring 26, the parts being preferably proportioned so as to require 25 or 30 pounds train pipe pressure to lift the piston head. However, as soon as the train pipe pressure has increased to the required degree and has thereby lifted the piston head from its seat, communication is opened through the feed groove 43 to the larger area of the portion 20 and thus the increased area being suddenly exposed to train pipe pressure causes the prompt and positive movement of the valve mechanism 13 to its upper seat 38, the latter seat being provided to prevent possible leakage of air from the train pipe in this position. A feed groove 37 also connects the chamber adjacent the differential area of portion 20 with the space above the same in the initial closed position of the valve mechanism 13, so that in case there should be any slight leakage, even with the seat 36 of the head 15 seated, such leakage can escape around the valve head 22 to the atmosphere. In this position of the valve mechanism 13, as shown in Fig. 1, the ports 23 are closed by the valve head 22.

Upon making a gradual reduction in train pipe pressure the piston 3 is shifted to service application position in the usual manner, the auxiliary valve uncovering the service port 31 in the main slide valve 5, which registers with passage 32 in service application position. Fluid from the auxiliary reservoir then flows through the port 31, passage 32, cavity 33 in valve 8, to passage 34 and thence around the transfer valve 10 to the brake cylinder passage 28, thus supplying air to the brake cylinder to effect an application of the brakes.

Further gradual reductions in train pipe pressure may also be made to effect an increased application of the brakes in the usual manner up to the point at which the auxiliary reservoir pressure equalizes with the brake cylinder pressure. If a further gradual reduction in train pipe pressure is now made after such equalization of pressures, the auxiliary reservoir pressure not being reduced by flow to the brake cylinder, the triple valve parts move out beyond the usual service position, compressing the first graduating spring 35, to a position known as the second service position, as shown in Fig. 2. In this position of the parts, the service port 31 is brought into register with second service port 14, so that fluid from the auxiliary reservoir now flows through the passage 14 to the chamber above the valve head 22.

As the pressure of fluid flowing from the auxiliary reservoir through the port 14 is at this time somewhat higher than the train pipe pressure acting on the outer face of piston head 15, it will be evident that the pressure of the spring 26 is sufficient to shift the valve mechanism 13 to its outer seated position, as shown in Fig. 2. It may be stated here that as soon as the portion 20 unseats, the feed groove 37 operates to permit equalization of fluid pressures upon opposite sides of the portion 20, thus facilitating the prompt outward movement of the valve mechanism by said spring.

The ports 23 being now uncovered, air is vented from the auxiliary reservoir through passage 24, ports 25, and the annular recess 39 in valve device 12 to exhaust port 40. Upon a reduction in auxiliary reservoir pressure to a degree equal to or slightly less than the reduced train pipe pressure, the triple valve piston shifts the auxiliary valve 6 to close the port 31. Further gradual reductions in train pipe pressure cause the operation of the parts in the same manner to still further reduce the auxiliary reservoir pressure, until the train pipe pressure has become reduced to a certain predetermined low degree, say 30 pounds, at which point, the spring 41, which acts on the valve device 12 in opposition to the train pipe pressure, shifts the same to cut off the exhaust port 40. Any further reduction in train pipe pressure thereupon effects the shifting of the parts to emergency position and an emergency application of the brakes is produced. Under the above conditions of operation, the piston check valve 29 is held seated by the spring 42, as the brake cylinder pressure acting on the spring side of the check valve is always equal to or greater than the auxiliary reservoir pressure on the opposite side thereof.

Now suppose that the triple valve parts are sluggish or stick and as a consequence upon a gradual reduction in train pipe pressure when the parts finally move they should happen to pass over the usual service position and go to the second service position. In such case, the port 31 registers with the port 14 as previously described, but by reason of there being no pressure in the brake cylinder and consequently on the spring side of piston check valve 29, said check valve is opened by the flow of air from the auxiliary reservoir and passing through the passage 27 charges the brake cylinder with fluid under pressure. Also, this flow of air to the brake cylinder relieves the pressure acting on the upper face of the piston valve 22, so that the train pipe pressure acting on the outer face of the head 15 is sufficient to maintain the valve mechanism 13 in its upper position closing communication through the ports 23 to the atmosphere. It will thus be seen that by means of this construction, if the triple valve parts should accidently move directly over to the second service position, no fluid can escape from the auxiliary reservoir and furthermore the air flowing from the auxiliary reservoir will be supplied to the brake cylinder. Thus an application of the brakes is assured even if the parts prematurely move to second service position and at the same time no air from the auxiliary reservoir is wasted or lost.

Having now described my invention, what I claim as new and desire to secure by Letters Patent, is:—

1. In a fluid pressure brake, the combination with a train pipe, pressure chamber, and a valve device subject to the opposing pressures of the train pipe and said pressure chamber and having one position for supplying air from said chamber to effect an application of the brakes and another position for venting air from said chamber, of means for effecting an application of the brakes with fluid vented from said chamber upon a premature movement of said valve device to the venting position.

2. In a fluid pressure brake, the combination with a train pipe, a pressure chamber, and a valve device subject to the opposing pressures of the train pipe and said pressure chamber and having a position in which air is supplied from the pressure chamber to effect an application of the brakes upon a gradual reduction in train pipe pressure and another position in which air is vented from said pressure chamber upon a gradual reduction in train pipe pressure below the equalizing point, to prevent movement of said valve device to emergency position, of means for diverting the vented fluid to the brake cylinder upon premature movement of said valve device to the second position before equalization of pressures.

3. In a fluid pressure brake, the combination with a train pipe and triple valve device operating upon a gradual reduction in train pipe pressure for supplying air from the auxiliary reservoir to the brake cylinder and having a position for venting air from the auxiliary reservoir upon a gradual reduction in train pipe pressure below the equalizing point, of means for diverting the vented air to the brake cylinder upon movement to said position before equalization.

4. In a fluid pressure brake, the combination with a train pipe and a triple valve device operating upon a gradual reduction in train pipe pressure for supplying air from the auxiliary reservoir to the brake cylinder and having a position for venting air from the auxiliary reservoir upon a gradual reduction in train pipe pressure below the equalizing point, of a valve mechanism subject to train pipe pressure normally closing the communication for venting air from the auxiliary reservoir and operated by the flow of air from the auxiliary reservoir in said position for opening said communication.

5. In a fluid pressure brake, the combination with a train pipe and a triple valve device operating upon a gradual reduction in train pipe pressure for supplying air from the auxiliary reservoir to the brake cylinder and having a position for venting air from the auxiliary reservoir upon a gradual reduction in train pipe pressure below the equalizing point, of means subject on one side to brake cylinder pressure and on the opposite side to the flow of air from the auxiliary reservoir in said position for controlling the supply of air to the brake cylinder and a valve mechanism subject to the opposing pressures of the train pipe and the flow of air from the auxiliary reservoir in said position for controlling the communication for venting air from the auxiliary reservoir.

6. In a fluid pressure brake, the combination with a train pipe and a triple valve device having a service position for supplying air from the auxiliary reservoir to the brake cylinder, and a second service position for venting air from the auxiliary reservoir, of means subject to the flow of air from the auxiliary reservoir in the second service position for controlling communication from the auxiliary reservoir to the brake cylinder and the communication for venting air from the auxiliary reservoir.

7. In a fluid pressure brake, the combination with a train pipe and a triple valve device having a service position for supplying air from the auxiliary reservoir to the brake cylinder, and a second service position for venting air from the auxiliary reservoir, of means normally operated by the flow of air from the auxiliary reservoir in the second service position for opening communication for venting air from the auxiliary reservoir and adapted upon movement of the triple valve to the second service position before equalization to hold the venting communication closed and to open a communication for supplying air from the auxiliary reservoir to the brake cylinder.

8. In a fluid pressure brake, the combination with a train pipe and a triple valve device having a service position for supplying air from the auxiliary reservoir to the brake cylinder, and a second service position for venting air from the auxiliary reservoir, of valve means adapted to control a communication for supplying air from the auxiliary reservoir to the brake cylinder in the second service position and normally maintained closed by the brake cylinder pressure and a valve mechanism for controlling communication for venting air from the auxiliary reservoir in said second service position and normally operated by the flow of air from the auxiliary reservoir in the second service position for opening said communication and adapted to hold said venting communication closed upon operation of said valve means to open communication for supplying air from the auxiliary reservoir to the brake cylinder.

9. In a fluid pressure brake, the combination with a train pipe and a triple valve device having a service position for supplying air from the auxiliary reservoir to the brake cylinder, and a second service position for venting air from the auxiliary reservoir, of means subject to the opposing pressures of the brake cylinder and the flow of air from the auxiliary reservoir in the second service position for controlling a communication from the auxiliary reservoir to the brake cylinder, said means being adapted when there is pressure in the brake cylinder to hold said communication closed and when there is no pressure in the brake cylinder to open said communication.

10. In a fluid pressure brake, the combination with a train pipe and a triple valve device having a service position for supplying air from the auxiliary reservoir to the brake cylinder, and a second service position for venting air from the auxiliary reservoir, of means adapted to open communication for venting air from the auxiliary reservoir either to an exhaust or to the brake cylinder in the second service position and operating upon a premature movement to the second service position to maintain said exhaust communication closed.

11. In a fluid pressure brake, the combination with a valve device movable to the usual service position for supplying fluid to the brake cylinder upon a gradual reduction in train pipe pressure and movable after equalization to a second service position in which the supply of fluid to the brake cylinder is cut off, of means for effecting the supply of fluid to the brake cylinder in the second service position upon failure of the valve device to supply fluid to the brake cylinder in the usual service position.

12. In a fluid pressure brake, the combination with a valve device having a normal service application position and movable to a second service application position after normal equalization, of means operated upon direct movement of the valve device to the second service position for supplying air to the brake cylinder.

In testimony whereof I have hereunto set my hand.

WALTER V. TURNER.

Witnesses:
S. W. KEEFER,
A. M. CLEMENTS.

Copies of this patent may be obtained for five cents each, by addressing the "Commissioner of Patents, Washington, D. C."